(12) United States Patent
Tsai

(10) Patent No.: US 8,116,007 B2
(45) Date of Patent: Feb. 14, 2012

(54) OPTICAL SIGHT FOR MAINTAINING DIOPTER ADJUSTMENT

(75) Inventor: Chen-Shuo Tsai, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 198 days.

(21) Appl. No.: 12/694,370

(22) Filed: Jan. 27, 2010

(65) Prior Publication Data

US 2011/0051258 A1   Mar. 3, 2011

(30) Foreign Application Priority Data

Aug. 31, 2009 (TW) .............................. 98129239 A

(51) Int. Cl.
G02B 27/10 (2006.01)
G02B 23/00 (2006.01)
G02B 7/02 (2006.01)
F41G 1/38 (2006.01)

(52) U.S. Cl. ........... 359/634; 359/399; 359/816; 42/119

(58) Field of Classification Search .................. 359/634, 359/350, 353, 399–403, 409–429, 806, 808–813, 359/815–825, 827–830; 42/119–123
See application file for complete search history.

(56) References Cited

U.S. PATENT DOCUMENTS 7,944,611 B1 * 5/2011 Regan et al. .................. 359/422
2002/0089742 A1 * 7/2002 Otteman ....................... 359/423
* cited by examiner Primary Examiner — Dawayne Pinkney
(74) Attorney, Agent, or Firm — Trop, Pruner & Hu, P.C.

(57) ABSTRACT

An optical sight includes a main barrel unit, an objective lens unit, an ocular lens unit, and a magnification unit. The main barrel unit extends about an axis. The objective lens unit is mounted to a front end of the main barrel unit. The ocular lens unit is mounted to a rear end of the main barrel unit, and includes an outer barrel securely connected to the main barrel unit, an inner barrel coupled threadedly with the outer barrel, a lens disposed in the inner barrel, an adjusting barrel disposed on the inner barrel and movable in a direction along the axis, and a release device disposed between the inner barrel and the adjusting barrel. The magnification unit is rotatably disposed in the main barrel unit between the objective lens unit and the ocular lens unit.

4 Claims, 6 Drawing Sheets

US 8,116,007 B2

OPTICAL SIGHT FOR MAINTAINING DIOPTER ADJUSTMENT

CROSS-REFERENCE TO RELATED APPLICATION

This application claims priority of Taiwanese Application No. 098129239, filed on Aug. 31, 2009.

BACKGROUND OF THE INVENTION

1. Field of the Invention

The present invention relates to an optical sight, more particularly to an optical sight for maintaining diopter adjustment.

2. Description of the Related Art

Referring to FIG. 1, U.S. Pat. No. 7,458,180 B2 discloses an optical sight. The optical sight includes a main barrel unit 1, an objective lens unit 2, an ocular lens unit 3, a magnification unit 4 rotatably disposed in the main barrel unit 1 between the objective lens unit 2 and the ocular lens unit 3, and an adjusting unit 5 disposed on the main barrel unit 1.

The ocular lens unit 3 includes an outer barrel 301 securely connected to the main barrel unit 1, an inner barrel 302 coupled threadedly with the outer barrel 301, and a plurality of lenses 303 disposed in the inner barrel 302.

When rotated, the inner barrel 302 moves along an axis, such that a distance between the lenses 303 and an image plane 101 changes to thereby achieve focusing adjustment. By performing such an operation, an appropriate diopter for a particular user is established.

However, the inner barrel 302 may be easily rotated due to inadvertent touching of the same or when the inner barrel 302 is accidentally bumped against another object. Such rotation of the inner barrel 302 leads to changes in the established diopter setting such that the user often needs to perform diopter re-adjustment.

SUMMARY OF THE INVENTION

Therefore, the object of the present invention is to provide an optical sight, which prevents a diopter setting from being inadvertently changed.

Accordingly, an optical sight of the present invention comprises a main barrel unit, an objective lens unit, an ocular lens unit, and a magnification unit.

The main barrel unit extends about an axis.

The objective lens unit is mounted to a front end of the main barrel unit.

The ocular lens unit is mounted to a rear end of the main barrel unit, and includes an outer barrel, an inner barrel, a lens, an adjusting barrel, and a release device. The outer barrel is securely connected to the main barrel unit. The inner barrel is coupled threadedly with the outer barrel. The lens is disposed in the inner barrel. The adjusting barrel is disposed on the inner barrel and is movable in a direction along the axis. The release device is disposed between the inner barrel and the adjusting barrel. The release device includes a first connecting portion disposed on the inner barrel, a second connecting portion disposed on the adjusting barrel and opposing the first connecting portion, and a compression spring abutting against the inner barrel and the adjusting barrel and disposed about the axis. The adjusting barrel is movable relative to the inner barrel and along the axis between a depressed position and a released position.

The compression spring is compressed, and the first and second connecting portions are engaged with each other when the adjusting barrel is in the depressed position, such that diopter adjustment of the ocular lens unit is possible. The compression spring restores, and the first and second connecting portions are separated from each other when the adjusting barrel is in the released position, such that diopter adjustment of the ocular lens unit is prevented.

The magnification unit is rotatably disposed in the main barrel unit between the objective lens unit and the ocular lens unit.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
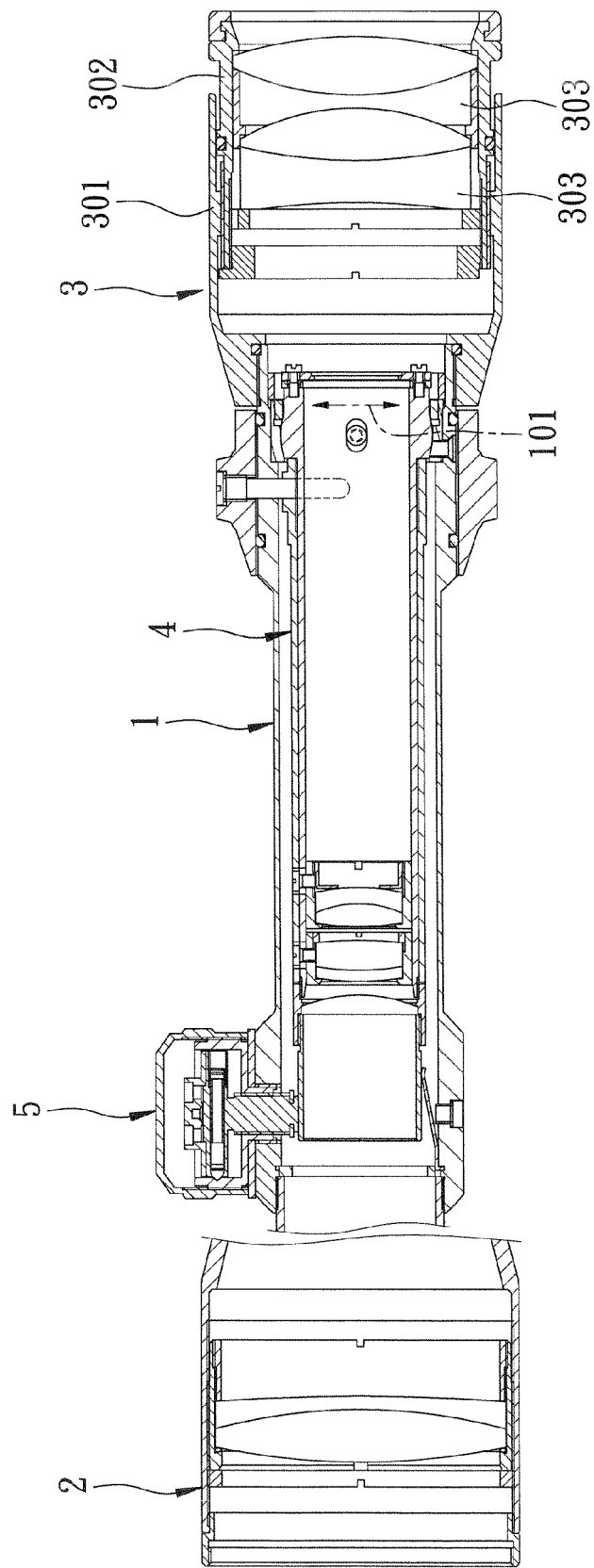
FIG. 1 is a sectional view of a conventional optical sight.
Figure 2:
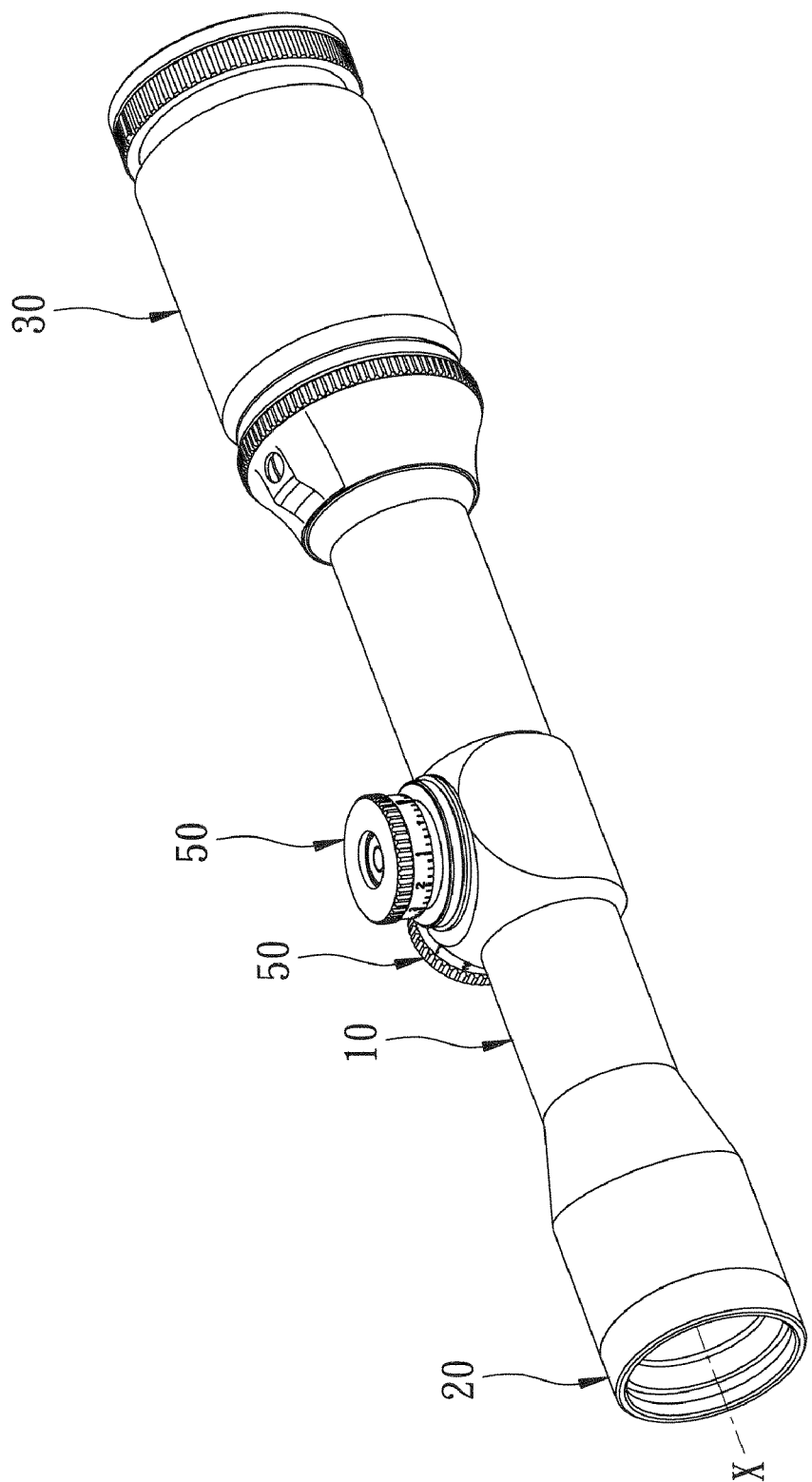
FIG. 2 is a perspective view of an optical sight for maintaining diopter adjustment according to a preferred embodiment of the present invention.
Figure 3:
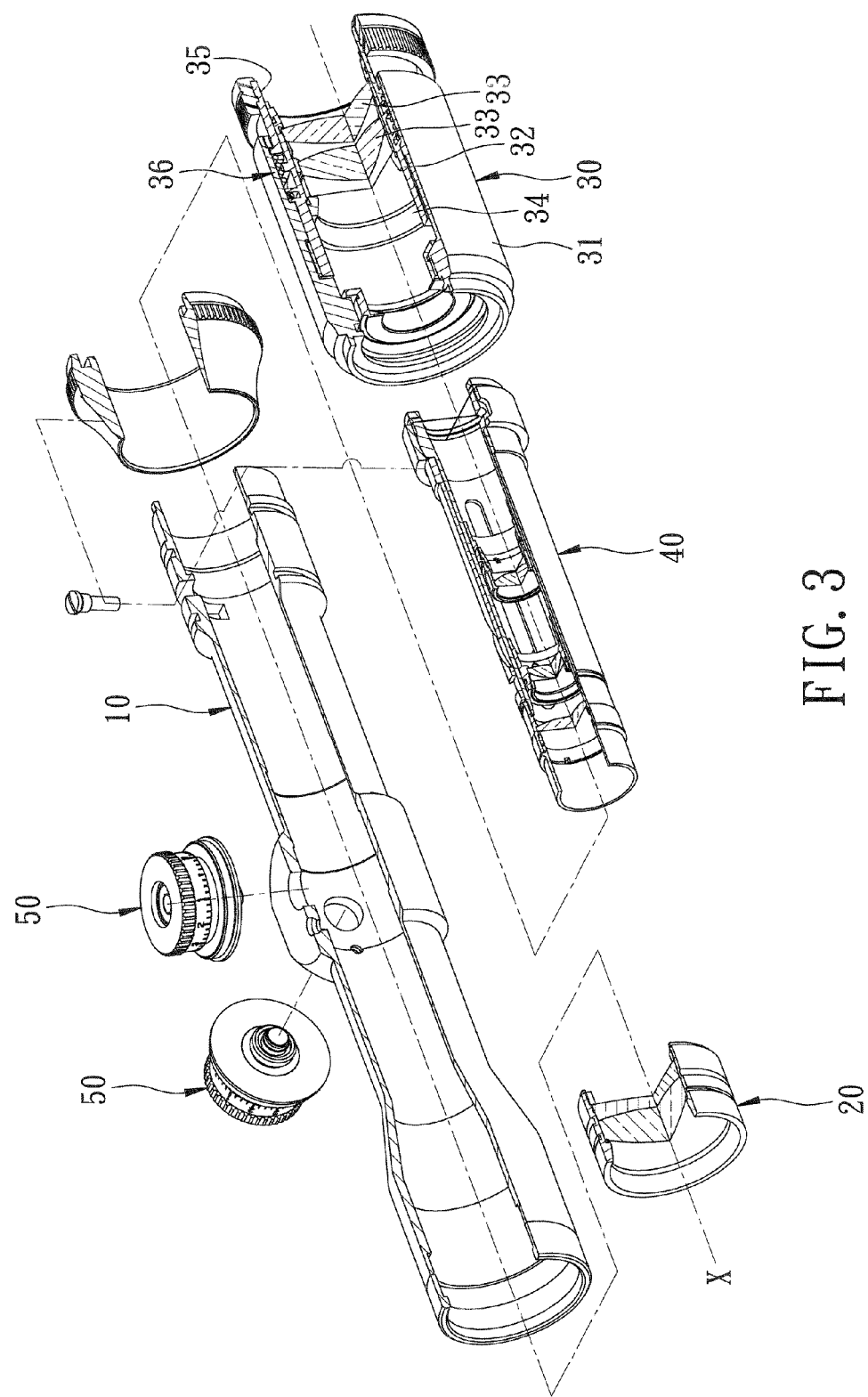
FIG. 3 is an exploded perspective view of the optical sight of the preferred embodiment.

Referring to FIGS. 2 and 3, a preferred embodiment of an optical sight according to the present invention is shown to comprise a main barrel unit 10, an objective lens unit 20, an ocular lens unit 30, a magnification unit 40, and two adjustment units 50.

The main barrel unit 10 extends about an axis (X).

The objective lens unit 20 is mounted to a front end of the main barrel unit 10.

The magnification unit 40 is rotatably disposed in the main barrel unit 10 between the objective lens unit 20 and the ocular lens unit 30.

The adjustment units 50 are disposed on the main barrel unit 10, and can be manipulated respectively for elevation and windage adjustment.

Figure 4:
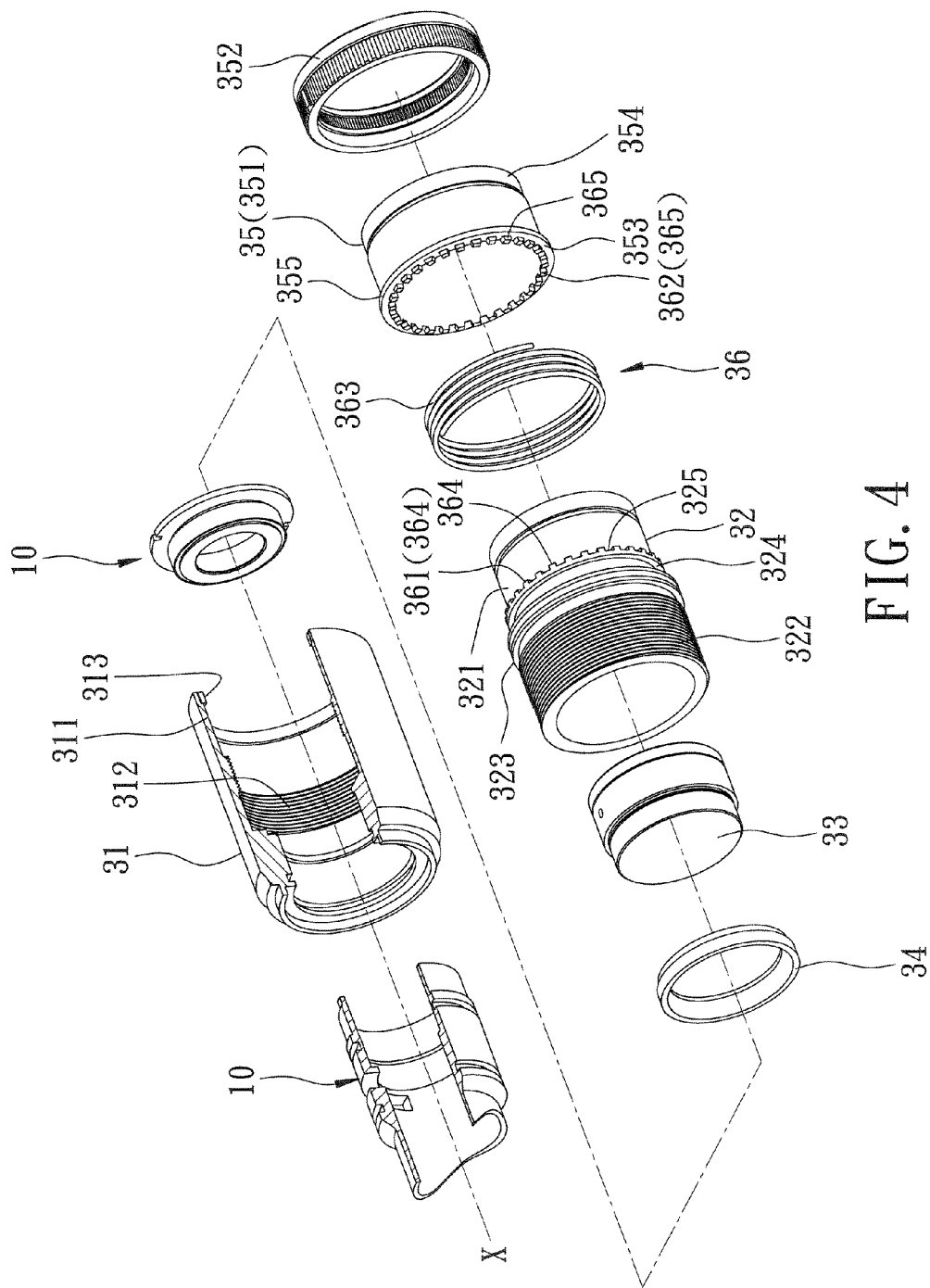
FIG. 4 is a fragmentary exploded perspective view of an ocular lens unit of the preferred embodiment.
Figure 5:
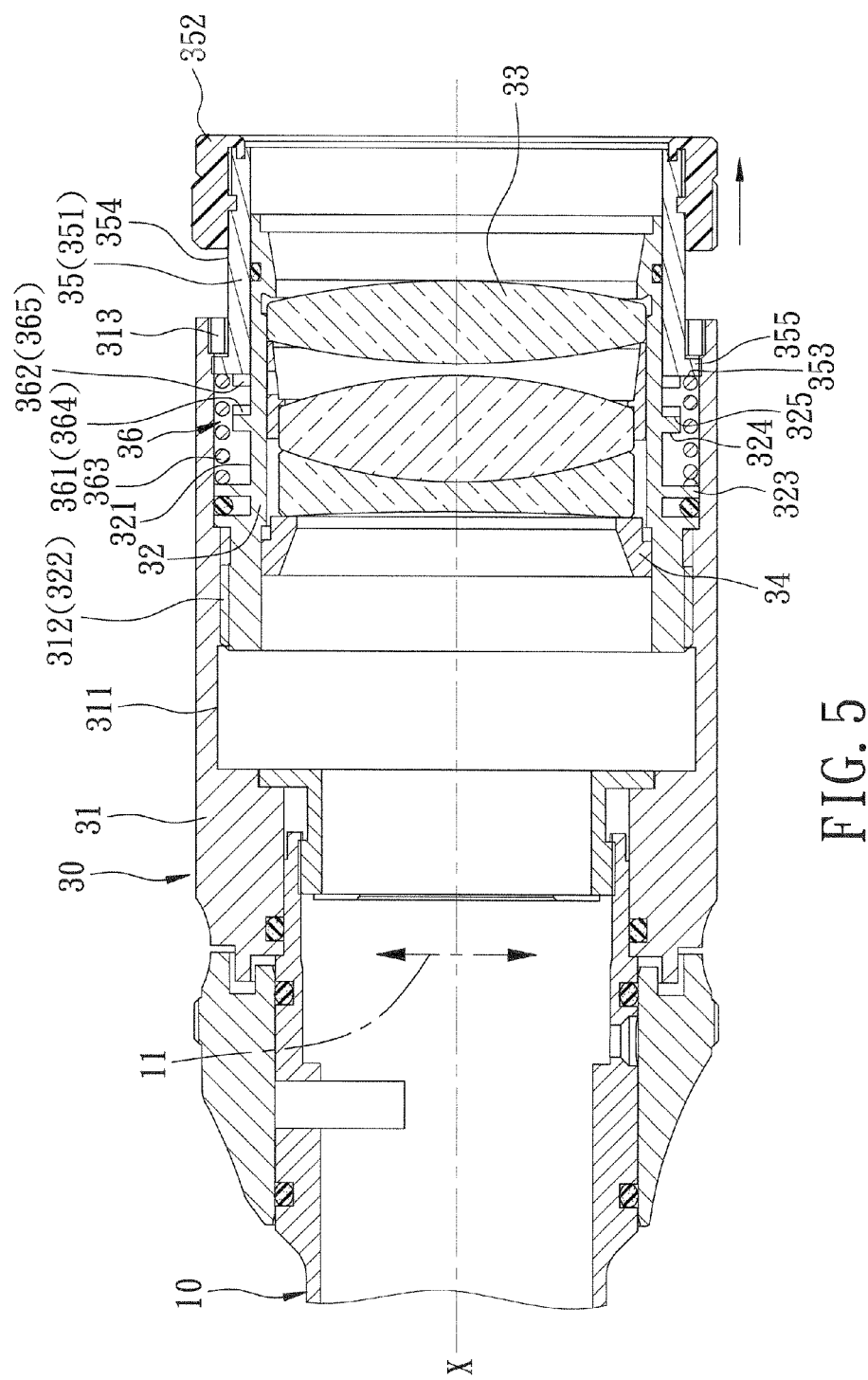
FIG. 5 is a fragmentary sectional view of the ocular lens unit of the preferred embodiment to illustrate a released position of an adjusting barrel.

Referring to FIGS. 3, 4, and 5, the ocular lens unit 30 is mounted to a rear end of the main barrel unit 10, and includes an outer barrel 31, an inner barrel 32, a plurality of lenses 33, a lens compression ring 34, an adjusting barrel 35, and a release device 36. The outer barrel 31 is securely connected to the main barrel unit 10. The inner barrel 32 is coupled threadedly with the outer barrel 31. The lenses 33 are disposed in the inner barrel 32. The lens compression ring 34 is disposed in the inner barrel 32, and abuts against the lenses 33. The adjusting barrel 35 is disposed on the inner barrel 32, and is movable in a direction along the axis (X). The release device 36 is disposed between the inner barrel 32 and the adjusting barrel 35.

The outer barrel 31 has an inner peripheral surface 311, an inner screw thread 312 formed on the inner peripheral surface 311, and a rear limiting portion 313 disposed on the inner peripheral surface 311 and protruding radially inwardly. In this embodiment, the rear limiting portion 313 is a lock ring securely mounted on the inner peripheral surface 311.

The inner barrel 32 has an outer peripheral surface 321, an outer screw thread 322 formed on the outer peripheral surface 321 and coupled threadedly with the inner screw thread 312, a first ring portion 323 disposed on the outer peripheral surface 321 and radially protruding from the outer peripheral surface 321, and a second ring portion 324 disposed on the outer peripheral surface 321 and radially protruding from the outer peripheral surface 321 between the first ring portion 323 and the adjusting barrel 35. The second ring portion 324 has a rear end surface 325 facing the adjusting barrel 35, and an outer diameter that is smaller than that of the first ring portion 323.

Figure 6:
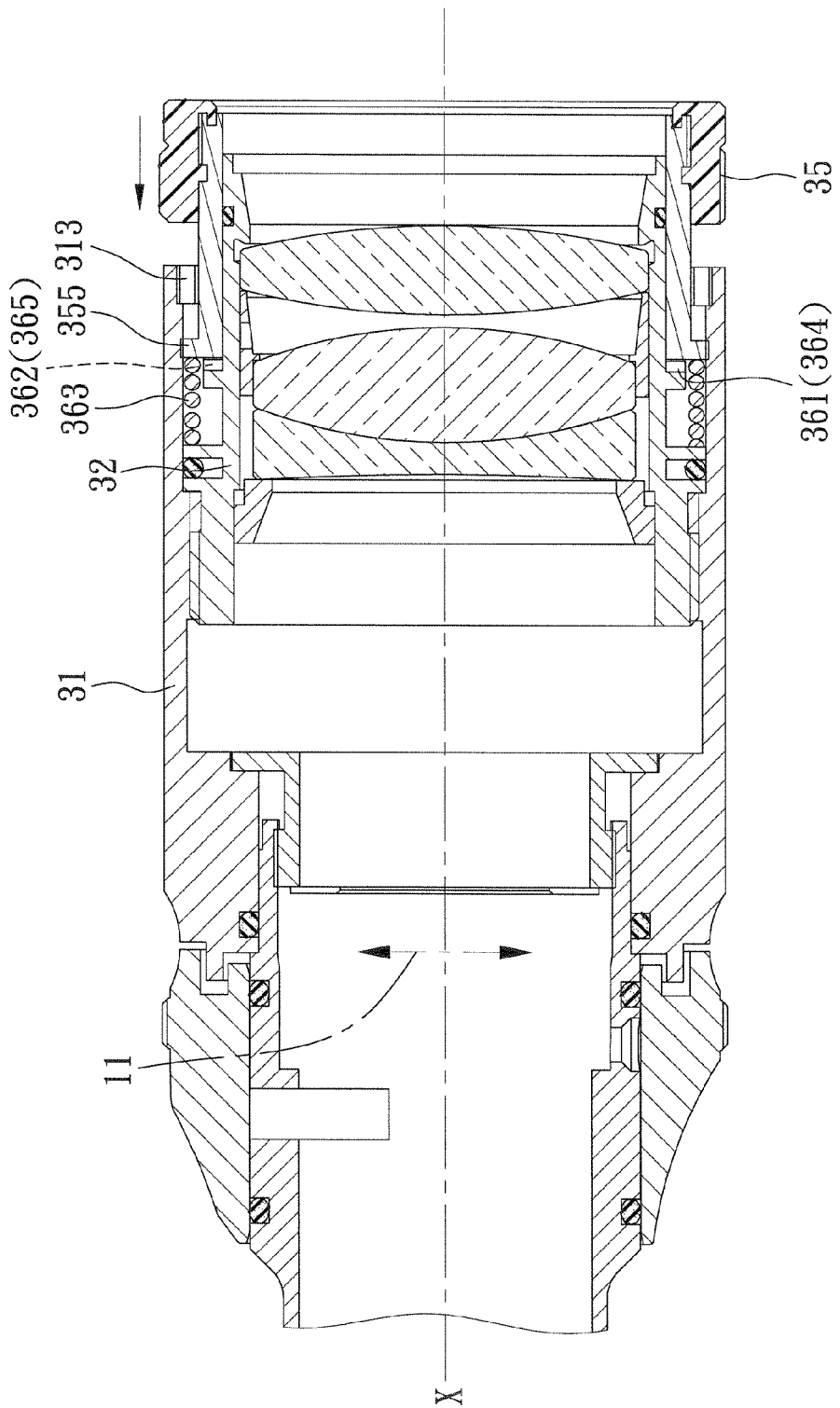
FIG. 6 is a fragmentary sectional view of the ocular lens unit of the preferred embodiment to illustrate a depressed position of the adjusting barrel.

The adjusting barrel 35 is movable relative to the inner barrel 32 and along the axis (X) between a depressed position as shown in FIG. 6, and a released position as shown in FIG. 5.

The adjusting barrel 35 has a barrel body 351 movably disposed on the inner barrel 32, and an outer ring portion 352 sleeved on a rear portion of the barrel body 351. The outer ring portion 352 may be rotated by a user. The adjusting barrel 35 also has a front end surface 353 facing the rear end surface 325 of the second ring portion 324 of the inner barrel 32, an outer peripheral surface 354, and a front limiting portion 355 disposed on the outer peripheral surface 354 and protruding radially outwardly. The front limiting portion 355 is in proximity to the front end surface 353. The front end surface 353 and the front limiting portion 355 are formed on the barrel body 351 of the adjusting barrel 35. In some embodiments, the front end surface 353 is formed partially on the front limiting portion 355 and partially on the barrel body 351. The outer ring portion 352 is disposed on an end of the barrel body 351 opposite an end thereof on which the front limiting portion 355 is disposed. The release device 36 includes a first connecting portion 361 disposed on the inner barrel 32, a second connecting portion 362 disposed on the adjusting barrel 35 and opposing the first connecting portion 361, and a compression spring 363 abutting against the inner barrel 32 and the adjusting barrel 35 and disposed about the axis (X).

The first connecting portion 361 has a plurality of rear protruding teeth 364 formed on the rear end surface 325 and circumferentially spaced apart about the axis (X). The second connecting portion 362 has a plurality of front protruding teeth 365 formed on an inner peripheral portion of the front end surface 353 and circumferentially spaced apart about the axis (X). The compression spring 363 abuts against the first ring portion 323 and an outer peripheral portion of the front end surface 353.

Referring to FIG. 6, when the adjusting barrel 35 is depressed to thereby place the adjusting barrel 35 in the depressed position, the compression spring 363 is compressed, the front limiting portion 355 is spaced apart from the rear limiting portion 313, and the rear protruding teeth 364 of the first connecting portion 361 and the front protruding teeth 365 of the second connecting portion 362 engage each other. In this state, rotation of the adjusting barrel 35 causes the inner barrel 32 to move relative the outer barrel 31, which changes a distance between the lenses 33 and an image plane 11 such that diopter adjustment of the ocular lens unit 30 is realized.

Referring to FIG. 5, when the adjusting barrel 35 is released, the compression spring 363 restores to thereby place the adjusting barrel 35 in the released position, the front limiting portion 355 is placed adjacent to the rear limiting portion 313, and the rear protruding teeth 364 of the first connecting portion 361 and the front protruding teeth 365 of the second connecting portion 362 are spaced apart from each other. Accordingly, rotation of the adjusting barrel 35 results merely in rotation of the adjusting barrel 35 itself relative the inner barrel 32 and no movement of the inner barrel 32, such that diopter adjustment of the ocular lens unit 30 does not occur.

The advantages of the present invention can be summarized as follows:

The present invention can isolate the inner barrel 32 from the adjusting barrel 35 using the release device 36. Therefore, even if the adjusting barrel 35 is inadvertently rotated, the inner barrel 32 does not undergo any rotation itself, such that the diopter setting is maintained. To perform diopter adjustment in the present invention, the adjusting barrel 35 must first be placed in the depressed position, which is not an operation that can take place from any inadvertent touching of the adjusting barrel 35 or even any inadvertent bumping of the same against an external object.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An optical sight for maintaining diopter adjustment comprising:
    a main barrel unit extending about an axis;
    an objective lens unit mounted to a front end of said main barrel unit;
    an ocular lens unit that is mounted to a rear end of said main barrel unit and that includes
        an outer barrel securely connected to said main barrel unit,
        an inner barrel coupled threadedly with said outer barrel,
        a lens disposed in said inner barrel,
        an adjusting barrel disposed on said inner barrel and movable in a direction along the axis, and
        a release device disposed between said inner barrel and said adjusting barrel,
        said release device including a first connecting portion disposed on said inner barrel, a second connecting portion disposed on said adjusting barrel and opposing said first connecting portion, and a compression spring abutting against said inner barrel and said adjusting barrel and disposed about the axis,
        said adjusting barrel being movable relative to said inner barrel and along the axis between a depressed position and a released position,
        said compression spring being compressed and said first and second connecting portions being engaged with each other when said adjusting barrel is in the depressed position, such that diopter adjustment of said ocular lens unit is possible,
        said compression spring restoring and said first and second connecting portions being separated from each other when said adjusting barrel is in the released position, such that diopter adjustment of said ocular lens unit is prevented; and
    a magnification unit rotatably disposed in the main barrel unit between said objective lens unit and said ocular lens unit.

2. The optical sight as claimed in claim 1, wherein:
    said outer barrel has an inner peripheral surface, and an inner screw thread formed on said inner peripheral surface;
    said inner barrel has an outer peripheral surface, an outer screw thread formed on said outer peripheral surface and coupled threadedly with said inner screw thread, a first ring portion disposed on said outer peripheral surface and radially protruding from said outer peripheral surface, and a second ring portion disposed on said outer peripheral surface and radially protruding from said outer peripheral surface between said first ring portion and said adjusting barrel, said second ring portion having a rear end surface facing said adjusting barrel;

said adjusting barrel has a front end surface facing said rear end surface;

said first connecting portion has a plurality of rear protruding teeth formed on said rear end surface and circumferentially spaced apart about the axis;

said second connecting portion has a plurality of front protruding teeth formed on an inner peripheral portion of said front end surface and circumferentially spaced apart about the axis;

said compression spring abuts against said first ring portion and an outer peripheral portion of said front end surface along the axis; and said front and rear protruding teeth engage each other when said adjusting barrel is moved to the depressed position, and are spaced apart from each other when said adjusting barrel is moved to the released position.

3. The optical sight as claimed in claim 2, wherein:

said outer barrel has a rear limiting portion that is disposed on said inner peripheral surface and protrudes radially inwardly, said adjusting barrel having an outer peripheral surface, and a front limiting portion that is disposed on said outer peripheral surface and protrudes radially outwardly, said front limiting portion being in proximity to said front end surface; and said front limiting portion is spaced apart from said rear limiting portion when said adjusting barrel is moved to the depressed position, and is placed adjacent to said rear limiting portion when said adjusting barrel is moved to the released position.

4. The optical sight as claimed in claim 3, wherein said adjusting barrel has a barrel body disposed on said inner barrel, and an outer ring portion sleeved on said barrel body, said front end surface and said front limiting portion being formed on said barrel body, said outer ring portion being disposed on an end of said barrel body opposite an end of said barrel body on which said front limiting portion is disposed.

\* \* \* \* \*